United States Patent [19]
Schmitt et al.

[11] Patent Number: 5,058,971
[45] Date of Patent: Oct. 22, 1991

[54] PLANAR OPTICAL ISOLATOR

[75] Inventors: Hans-Jürgen Schmitt; Jürgen Seidenberg; Norbert Thorweihe, all of Aachen; Hans Dammann, Tangstedt; Volker Doormann; Jens-Peter Krumme, both of Hamburg, all of Fed. Rep. of Germany

[73] Assignee: U.S. Philips Corp., New York, N.Y.

[21] Appl. No.: 482,142

[22] Filed: Feb. 16, 1990

[30] Foreign Application Priority Data

Feb. 16, 1989 [DE] Fed. Rep. of Germany ....... 3904660

[51] Int. Cl.$^5$ ...................... G02F 1/025; G02F 1/095
[52] U.S. Cl. ........................................ 385/11; 385/130; 359/484
[58] Field of Search .................... 350/96.12, 377, 378, 350/387, 375, 376, 96.13, 385, 386

[56] References Cited

U.S. PATENT DOCUMENTS

| | | | |
|---|---|---|---|
| 3,830,555 | 8/1974 | Warner | 350/96.13 |
| 4,032,216 | 6/1977 | Henry | 350/96.13 |
| 4,522,473 | 6/1985 | Hibiya et al. | 350/377 |
| 4,746,182 | 5/1988 | Dammann et al. | 350/96.13 |
| 4,859,013 | 8/1989 | Schmitt et al. | 350/96.13 |

OTHER PUBLICATIONS

Castera et al., "Isolator in Integrated Optics Using the Faraday and Cotton–Mouton Effects", *IEEE Transactions on Magnetics*, vol. Mag-13, No. 5, Sep. 1977, pp. 1583 to 1585.
Henry, "Thin-Film Optical Magnetic Mode Converters", *Applied Physics Letters*, vol. 26, No. 7, pp. 408–411, Apr. 1, 1974.
Hepner et al., "Studies of Magnetooptical Effects in Garnets Thin Film Waveguides", *Alp Conference Proceedings*, No. 29, pp. 658–659, 1976.
Semileaky Thin-Film Optical Isolator, Journal of Applied Physics, 52(5), May 1981, pp. 3190–3199.
Design Feasibility of a Single Mode Optical Isolator, IEEE Journal of Quantum Electronics, vol. QE-18 (1982), Nov., No. 11, pp. 1975–1981.
"Gyrotropic Waveguides", Academic Press, 1981, pp. 52–53, by Paul Hlawiczka.

*Primary Examiner*—Bruce Y. Arnold
*Assistant Examiner*—Martin Lerner
*Attorney, Agent, or Firm*—William L. Botjer

[57] ABSTRACT

The invention relates to a planar optical isolator having a magneto optical gyrotropic layer and an anisotropic birefringent layer which are proportioned so that the non-reciprocal rotation of polarisation of the light (Faraday rotation) resulting from the action of a magnetic field in the forward direction of the isolator is at least substantially negatively equal to the reciprocal rotation of polarisation as a result of the birefringence, so that a TE-mode in the forward direction is guided with low damping, measures being taken for the intensive attenuation of at least one TM-mode. An isolator having a high isolating effect in which magneto optical gyrotropic layers and anisotropic birefringent layers can be connected epitaxially is obtained in that the waveguiding core layer comprises two rare earth-iron garnet (YIG) layers which are differently doped to obtain different specific birefringence.

12 Claims, 1 Drawing Sheet

| 8 | |
|---|---|
| 7 | Au |
| 6 | $Gd_{2.34}La_{0.44}Bi_{0.22}Fe_3Ga_2O_{12}$ |
| 5 | $Gd_2Bi_1Fe_{4.4}Ga_{0.3}Al_{0.3}O_{12}$ |
| 4 | $La_2Bi_1Fe_{4.4}Ga_{0.3}Al_{0.3}O_{12}$ |
| 3 | $Y_3Fe_5O_{12}$ |
| 2 | $Y_3(Fe,Co)_5O_{12}$ |
| 1 | $Gd_3Ga_5O_{12}$ |

| 8 |
|---|
| 7 Au |
| 6 $Gd_{2.34}La_{0.44}Bi_{0.22}Fe_3Ga_2O_{12}$ |
| 5 $Gd_2Bi_1Fe_{4.4}Ga_{0.3}Al_{0.3}O_{12}$ |
| 4 $La_2Bi_1Fe_{4.4}Ga_{0.3}Al_{0.3}O_{12}$ |
| 3 $Y_3Fe_5O_{12}$ |
| 2 $Y_3(Fe,Co)_5O_{12}$ |
| 1 $Gd_3Ga_5O_{12}$ |

FIG.1

| 13 |
|---|
| 12 YIG-film |
| 11 YIG-cladding |
| 10 YIG-absorber |
| 9 GGG |

FIG.2

PLANAR OPTICAL ISOLATOR

BACKGROUND OF THE INVENTION

The invention relates to a planar optical isolator having a magnetooptical gyrotropic layer and an anisotropic birefringent layer which are proportioned so that the non-reciprocal rotation of polarisation of the light (Faraday effect) resulting from the action of a magnetic field in the forward direction of the isolator is at least substantially negatively equal to the reciprocal rotation of polarisation as a result of the birefringence, so that a TE-mode in the forward direction is guided with low damping, measures being taken for the intensive attenuation of at least one TM-mode.

In this case it relates to isolators in which the functions of a non-reciprocal means for rotating the polarisation, a reciprocal means for rotating the polarisation and of polarisers are combined in one single component. The plane of polarisation of the light (TE-mode) is not varied in the forward direction. Compact and comparatively short (approximately 10 mm) components are obtained.

Gyrotropic, optically low-damping and magnetooptical YIG crystal layers of a stripe waveguide permit a comparatively strong non-reciprocal rotation of polarisation. In general there is referred to YIG layers also when yttrium was substituted entirely or partly by other rare earth metal elements.

The reciprocal rotation of polarisation which occurs with the same sense of rotation in the forward direction and in the reverse direction of the polariser is obtained by anisotropic birefringent properties of waveguide layers.

For a pre-determined wavelength of the light the stripe waveguides can be proportioned in their magneto optical and birefringent properties so that in the forward direction the non-reciprocal and the reciprocal rotation of polarisation are negatively the same. For example, a TE-mode oscillating perpendicularly to the plane of the layer can be guided through the insulator without rotation of polarisation. In the reverse direction on the contrary, the said TE-mode is increasingly converted into a TM-mode oscillating perpendicularly thereto, since in the said direction the reciprocal and the non-reciprocal phase rotations have a supporting effect in the same sense.

In the isolator known from IEEE Journal of Quantum Electronics 1982, pp 1975 to 1981, in which an isotropic magnetooptical waveguide layer is provided between cladding layers of anisotropic substrate and an anisotropic birefringent crystal layer, metal layers are provided at the ends of the isolator which exert a polarising effect in that they only damp the TM-modes selectively. The building length of the said known isolator must now be matched in such a manner that a complete conversion, for example, of a TE-mode into a TM-mode must have occurred on the return path. This is achieved by superposition of a Faraday rotation through 45° and a rotation of 45° caused by the birefringence. The TM-mode is finally damped by the metal strips, so that in the final result substantially no light emanates from the isolator in the reverse direction. Besides an accurate phase matching ($\Delta\beta=0$) of the TM-and TE-modes to ensure equal velocities of propagation, a careful length matching is required for a useful isolator action of the said so-called 45°-waveguide isolator. In addition, intimate connection of strongly birefringent layer materials with a magnetooptical layer will present difficulties. This latter difficulty also exists in an isolator known from J. Appl. Phys. 1981, pp 3190 to 3199, in which an $LiNbO_3$ layer is to be connected to a YIG layer. The isolating activity of this known isolator is obtained by conversion of a reverse TE-mode into a radiating TM-mode. Experimentally, isolating activities of only 10 dB were achieved because, probably in spite of a selenium intermediate layer, a sufficiently intimate optical contact of the YIG layer with the $LiNbO_3$ layer was not obtained and because on the other hand the theoretically required radiation of TM-modes in itself is completely possible only in an infinitely thick $LiNbO_3$ layer.

SUMMARY OF THE INVENTION

It is the object of the invention to provide an isolator of the type mentioned in the opening paragraph in which magnetooptical gyrotropic layers and anisotropic birefringent layers can be connected epitaxially and which shows a high isolating effect.

This object is achieved in that the waveguiding core layer consists of two rare earth-iron garnet (YIG) layers which are doped differently so as to achieve different specific birefringence.

When, according to the invention, the core layer consists of two magneto optical composite layers, which are different as regards their birefringent properties, it is possible, in spite of the comparatively weak voltage-induced birefringence of YIG layers, to reach both the required phase matching ($\Delta\beta=0$) of a TE-basic mode and of a TM basic mode, and the equality of the non-reciprocal and reciprocal rotations of polarisation. By different dopings of the component layers various lattice constants can be adjusted, so that in the second component layer in the epitaxial growth thereof a mechanical stress is formed which results in an anisotropy and the desired birefringence in particular on GGG-substrate with (110) crystal orientation. As compared with a growth from the liquid phase a growth of the second component layer by sputtering presents the advantage that greater differences of the lattice constants can be permitted, as result of which a higher mechanical stress and a larger birefringence are obtained. The differences of the lattice constants are preferably to be chosen to be so that compressive stresses are obtained because the tearing limit of the garnet is rapidly achieved under a tensile stress.

A simple embodiment is characterised in that the first YIG component layer is isotropic and the second YIG component layer is anisotropic. Anisotropy is possible only for one of the two magnetooptical component layers.

A construction of layers which is particularly effective as regards the reciprocal rotation of polarisation is characterized in that both YIG component layers are differently anisotropic in that the reciprocal rotary actions thereof occur with different signs of angle of rotation. For example, the first component layer may be grown on a basic layer with such a difference of the lattice constant that tensile forces appear, while the second component layer has such a different lattice constant with respect to the first component layer that a compressive force occurs in it.

The attenuation in particular of a TM-basic mode is possible particularly effectively by means of an electrically readily conductive cladding layer which preferably is a metal layer, in particular a gold layer. Such a metal layer absorbing TM-modes selectively is provided continuously as a cladding layer over the whole waveguide. As a result of this the part of a TE-mode guided in the reverse direction and converted into a TM-mode is immediately absorbed continuously throughout the isolator length. The function of the isolator according to the invention is independent of length, the damping in the reverse direction measured in dB being proportional to its length.

In order that a TE-mode is attenuated in the forward direction as little as possible by the metal layer, it is ensured that an optically low-damping buffer layer is provided between the wave-guiding core layer and the metal layer, the refractive index of said buffer layer being smaller than that of the adjacent core layer.

For the damping of higher modes, in particular with small differences in refractive indices between the waveguiding core layers and adjacent cladding layers it is advantageous that an absorption layer which has a high optical damping is provided over a cladding layer.

All the waveguiding layers of an isolator according to the invention can be manufactured from accordingly doped YIG-layers to form monolithic elements (in which yttrium may be replaced partly or entirely by other rare earth elements) which may be provided successively on a GGG-substrate which is preferably oriented in (110).

A particularly simple construction of an isolator mentioned in the opening paragraph to achieve the object mentioned in the opening paragraph is characterised in that the isolator is constructed from the following layers grown epitaxially successively on a (110) oriented GGG-substrate:

YIG-absorber layer with high damping
anisotropic YIG cladding layer with low optical damping
waveguiding gyrotropic and isotropic YIG-layer having a refractive index which is increased compared with the cladding layer
air,
in which the thicknesses and the elements of the dielectric tensor of the absorber layer, of the cladding layer and of the waveguiding layer are proportioned so that the $TE_o$-basic mode in the forward direction can be guided with low-loss and in the reverse direction is converted into the $TM_1$-mode, and that the optical dampings for all guidable modes, in particular for the $TM_1$-mode, are essentially larger than the damping for the TE-basic mode, and that the phase constants of $TE_o$-basic mode and $TM_1$-mode are approximately the same.

In this embodiment a metal layer and splitting of the waveguiding layer into two component layers may be omitted. The $TE_o$-basic mode is passed in the forward direction substantially without damping as a result of counter compensation of the reciprocal and non-reciprocal rotations of polarisation with plane of vibration remaining the same. A $TE_o$-basic mode reflected in the reverse direction is converted into a $TM_1$-mode which is attenuated by the highly absorbing cladding layer.

In this simplified embodiment it is necessary for the layer thicknesses to be maintained very carefully since otherwise inadmissible deviations of the phase matching of the $TM_o$-basic mode and of the $TM_1$-mode occur.

BRIEF DESCRIPTION OF THE DRAWINGS

The invention will now be described in greater detail with reference to the accompanying drawing:

FIG. 1 shows an embodiment of an isolator proportioned according to the invention.

FIG. 2 shows a particularly simple embodiment of an isolator according to the invention.

DETAILED DESCRIPTION OF THE PREFERRED EMBODIMENTS

The properties of waveguiding layers essential for an isolator are described by the dielectric tensor $\Sigma$:

$$\Sigma = \begin{matrix} \Sigma_{xx} & \Sigma_{xy} & \Sigma_{xz} \\ \Sigma_{yx} & \Sigma_{yy} & \Sigma_{yz} \\ \Sigma_{zx} & \Sigma_{zy} & \Sigma_{zz} \end{matrix}$$

This is based on the following system of coordinates:
z: forward direction of the isolator
y: perpendicular to the forward direction in the plane of the layer
x: perpendicular to the plane of the layer Instead of the complex tensor elements $\Sigma_{xx}, \Sigma_{yy}, \Sigma_{zz}$ in the directions of the coordinates x, y and z, the corresponding complex refractive indices $n_{xx}, n_{yy}$ and $n_{zz}$ are indicated which are derived from the equation $n^2 = \Sigma$ and the imaginary part of which is a measure of the optical absorption of the materials of the layer.

The imaginary part of the auxiliary diagonal elements $\Sigma_{xy} = -\Sigma_{yx}$ is a measure of the Faraday rotation under the influence of a magnetic field applied in the z-direction.

The real part of the elements $\Sigma_{yz} = \Sigma_{zy}$ is a measure of the birefringence of optically anisotropic layers.

Of course, the thicknesses d of the individual layers are also decisive of the behaviour of multilayer waveguides. When the dielectric tensors of the individual layers and their thicknesses are known, the optical behaviour of a multilayer waveguide can be calculated on the basis of the Maxwell equations for a given wavelength of the light. Corresponding computing methods have been used, for example, in IEEE Journal of Quantum Electronics 1982, pp. 1975 to 1981.

The isolator according to the invention shown in FIG. 1 proportioned for a wavelength $\lambda = 1300$ comprises seven layers: The GGG substrate 1 comprises gadolinium-gallium garnet having a lattice constant of 12.38 Å and a refractive index of $n = 1.945$ in all the coordinate directions. It is advantageously cut in (110) orientation.

The absorbing layer 2, the cladding layer 3, the waveguiding component layer 4 and the waveguiding layer 5, as well as the buffer layer 6 comprise differently substituted so-called YIG-layers. The lattice constants and/or the refractive indices and/or the Faraday rotation of the layers are influenced in a desired and known manner by suitable substitution elements. Chemical formulae of the individual layers suitable for the embodiment are depicted in FIG. 1.

The isotropic gold layer 7 of thickness $d_7 = 1.00$ μm has the refractive index $n = 0.69$-$i$ $7.26$ in all the coordinate directions. Above said layer there is air 8 having the refractive index $n = 1$.

The YIG buffer layer 6 having the lattice constant 12.50 Å has a thickness of $d_6 = 0.80$ μm. Its dielectric characteristics are:

$nxx = 2.112\text{-}i\ 1.2 \times 10^{-6}$
$nyy = nzz = 2.1\text{-}i\ 1.2 \times 10^{-6}$
$\Sigma_{xy} = i\ 0.000625\ \Sigma_{yz} = 0.0092$ The anisotropic waveguiding YIG-component layer 5 having the lattice constant 12.50 Å has a thickness of 0.32 μm. Its dielectric characteristics are:

$nxx = 2.322\text{-}i\ 1.2 \times 10^{-6}$
$nyy = nzz = 2.3\text{-}i\ 1.2 \times 10^{-6}$
$\Sigma_{xy} = i\ 0.000625\ \Sigma_{yz} = 0.0092$ The isotropic waveguiding layer 4 having the lattice constant 12.38 Å has a thickness of 0.30 μm and has the following dielectric characteristics:

$n = 2.322\text{-}i\ 1.2 \times 10^{-6}$
$\Sigma_{xy} = i\ 0.000625$

The YIG cladding layer 3 having the lattice constant 12.38 Å has a thickness of 2.00 μm and has the following dielectric characteristics:

$n = 2.200\text{-}i\ 1.2 \times 10^{-6}$
$\Sigma_{xy} = i\ 0.000625$

The YIG absorber layer 2 having the lattice constant 12.38 Å has a thickness of 4.00 μm. Its dielectric characteristics are $n = 2.200\text{-}i\ 0.001$ The layers 2 to 7 can be provided epitaxially successively. Since the waveguiding layer 5 is provided on a waveguiding layer 4 which has a lower lattice constant, compressive stresses occur in it as well as in the YIG buffer layer 6, which stresses are responsible for the formation of the birefringence ($\Sigma_{yz} = 0.0092$). The value of $\Sigma_{yz}$ is highest when the substrate comprises the crystallographic (110) orientation.

The layers 2 to 6 may be grown epitaxially from the liquid phase or also by sputtering. The layer 5, however, should advantageously be provided by sputtering because this method can also be used readily with a greater difference of the lattice constants of layer 4 and layer 5.

The embodiment shown in FIG. 1 represents a special possibility of realising the method according to the invention. However, the dielectric characteristics of the individual layers can also be reached by different substitutions. The use of YIG as a basic material is recommendable, because GGG-substrates are commercially available, for example, for bubble memories.

The dielectric tensors and thicknesses d of the individual layers may be varied relatively to each other to fulfil the following conditions with given wavelengths of the light:

phase matching ($\Delta\beta \approx 0$) between the TM- and TE-modes which are convertible in each other monomodality (NON-guidability and/or absorption of higher modes)

particularly high attenuation of the TM-basic mode by selective absorption (in particular by a metal layer)

equalisation of the amounts of the reciprocal and non-reciprocal rotations of polarisation and mode transformations of the convertible TE- and TM-modes, respectively.

The best part of the isolator structure shown in FIG. 1 is the waveguiding core which is divided into an isotropic and anisotropic film and which guides the TE- and TM-modes and which results in a particularly large overlapping integral of the $E_y$- and $E_z$-fields due to the location of the boundary face between the component layers 4 and 5, as a result of which for given values of $\Sigma_{yz}$ the reciprocal coupling between the TE- and TM-basic modes produced by the anisotropic film becomes particularly large. The anisotropic buffer layer 6 intensifies the said coupling effect further, since the $E_z$-field there has the same sign substantially everywhere as in the layer 5. Moreover, the buffer produces an optimum matching of the field of the TM-mode to the overlying gold layer, as a result of which the TM-basic mode and all higher TM-modes are effectively damped away without essentially interfering with the TE-basic mode. On the other side of the layer packet a cladding layer 3 (cladding) separates the TE-basic mode from penetrating into the absorber (2) damping away all the higher TE-modes. A monomode waveguide is then obtained with a sufficiently accurate phase matching of the TE- and TM-basic modes also in the case of tolerance deviations of the layer thicknesses. Only the TE-basic mode is guided in a substantially undamped manner, while the TM-basic mode and all the higher TE- and TM-modes are absorbed. Moreover, the reciprocal coupling effect is distributed so that substantially only contributions of the same sign occur in the overlapping integral of the $E_y$- and $E_z$-fields so that for a given $\Sigma_{yx}$ a maximum mode conversion occurs.

Approximately the following values are obtained for the expansion dampings (dB/mm) in the FIG. 1 example:

| basic mode: | TE | TM |
| --- | --- | --- |
| forwards | 0.1 | 16.5 |
| backwards | 7.7 | 8.9 |

So with a length of, for example, 1 cm one has an isolation of approximately 80 dB with a forward damping of only 1 dB. Typical of the design is that the thicknesses decrease with increasing index steps. The advantageous value of the field distributions enabling overlap integrals are a decisive criterion for the proportioning of the layer thicknesses.

In the isolator shown in FIG. 2 the following layer construction is given:

GGG substrate layer 9

YIG absorber layer 10 having a thickness $d_{10} = 5$ μm and the following dielectric characteristics:
$n = 2.300\text{-}i\ 0.002$ YIG-cladding layer 11 having a thickness $d_{11} = 3.8$ μm and the following dielectric characteristics:
$nxx = 2.312\text{-}i\ 1.2 \times 10^{-6}$
$nyy = nzz = 2.3\text{-}i\ 1.2 \times 10^{-6}$
$\Sigma_{xy} = i\ 0.0005\ \Sigma_{yz} = 0.0092$ waveguiding core-YIG-layer 12 having a thickness $d_{12} = 2.14$ μm and the following dielectric characteristics:
$n = 2.314\text{-}i\ 1.2 \times 10^{-6}$
$\Sigma_{xy} = i\ 0.0005$ air layer (thickness ∞) with n=1.

This structure also represents a polariser for λ = 1300 nm which only passes the $TE_o$-basic mode in the forward direction in a substantially undamped manner (0.2 dB/mm). Higher TE- and all TM-modes are damped more strongly. Phase matching is ensured for the $TE_o$-basic mode and the $TM_1$-mode. The $TM_1$-mode is sufficiently damped with 8.6 dB/mm (forwards) and 4.4 (backwards). The overlapping integral between $E_y$ (TE-basic mode) and $E_z$ ($TM_1$)-field is sufficiently large for satisfactory reciprocal mode coupling. The construction principle of the isolator comprises the combination of an isotropic core with an anisotropic cladding. As a result of this, on the one hand an effective reciprocal $TE_o/TM_1$-mode coupling is achieved, and on the other hand the $TM_o$-basic mode is also damped sufficiently by the absorber. A disadvantage of this very simple embodiment is that, in contrast with the FIG. 1 example, a sufficiently accurate phase matching permits only very small fluctuations of the layer thickness $d_{12}$ by a critical value.

We claim:

1. A planar optical isolator having a waveguiding core layer with neighboring coating layers, wherein the refractive index of the core layer is larger than the refractive indexes of the coating layers and the core layer comprises a magnetooptical gyrotropic layer and an anisotropic birefringent layer which are proportioned so that the non-reciprocal rotation of the polarization of the light (Faraday rotation) resulting from the action of a magnetic field in the forward direction of the isolator is at least substantially negatively equal to the reciprocal rotation of polarization as a result of the birefringence, so that a TE-mode wave in the forward direction is guided with low damping, and means for the intensive attenuation of at least one TM-mode, wherein the improvement comprises: the waveguiding core layer consists of two rare earth-iron garnet (YIG) layers which are differently doped so as to obtain different specific birefringences and that at least one layer with a higher optical damping is provided, said higher optical damping layer being parallel to the core layer.

2. An isolator as claimed in claim 1, characterised in that at least one of the YIG component layers is provided on the other layer by sputtering.

3. An isolator as claimed in claim 1, characterised in that the lattice constants of the YIG component layers are different.

4. An isolator as claimed in claim 1, characterised in that the first YIG component layer is isotropic and the second YIG component layer is anisotropic.

5. An isolator as claimed in claim 1, characterised in that the two YIG component layers are differently anisotropic in such a manner that their reciprocal rotary actions occur with different rotary angle sign.

6. An isolator as claimed in claim 1, characterised in that it includes an electrically conducting cladding layer.

7. An isolator as claimed in claim 6, characterised in that the electrically conducting layer is a gold layer.

8. An isolator as claimed in claim 7, characterized in that an optically low-damping buffer layer whose refractive index is smaller than that of the adjacent core layer is provided between the wave guiding core layer and the metal layer.

9. An isolator as claimed in claim 1, characterised in that the core layer is present on an optically low-damping cladding layer which has a lower refractive index.

10. An isolator as claimed in claim 9, characterised in that the cladding layer is provided between the core layer and an absorption layer optically guiding with high damping.

11. An isolator as claimed in claim 1, characterised in that it consists of YIG layers which are grown successively epitaxially on a GGG-substrate cut in (110), on which layers a metallic cladding layer is provided.

12. A planar optical isolator having a magnetooptical gyrotropic layer and an anisotropic birefringenet layer which are proportioned so that the non-reciprocal rotation of polarization of the light (Faraday rotation) resulting from the action of a magnetic field in the forward direction of the isolator is at least substantially negatively equal to the reciprocal rotation of polarization as a result of the birefringence, so that a TE-mode in the forward direction is guided with low damping, measures being taken for the intensive attenuation of at least one TM-mode, characterised in that the isolator is built up from the following layers which are grown epitaxially successively on a GGG-substrate which is cut in (110):

YIG absorber layer having a high damping
anisotropic YIG cladding layer having a low optical damping
waveguiding, gyrotropic and isotropic YIG layer having a refractive index which is higher compared with the cladding layer
air, in which the thicknesses and the $\Sigma$-tensors of the dielectric constants of the absorber layer, of the cladding layer and of the waveguiding layer are proportioned so that the $TE_o$-basic mode in the forward direction can be guided with low loss and in the reverse direction is converted into the $TM_1$-mode, and that the optical dampings for all the guidable modes are essentially larger than the damping for the $TE_o$-mode, and that the phase constants of the $TE_o$-basic mode and of the $TM_1$-mode are approximately equal.

* * * * *